US008364794B2

(12) United States Patent
Seymour

(10) Patent No.: US 8,364,794 B2
(45) Date of Patent: Jan. 29, 2013

(54) ADMISSION CONTROL FRAMEWORK METHOD AND SYSTEM

(75) Inventor: Jon Seymour, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 12/721,629

(22) Filed: Mar. 11, 2010

(65) Prior Publication Data

US 2011/0225271 A1   Sep. 15, 2011

(51) Int. Cl.
*G06F 15/177* (2006.01)
(52) U.S. Cl. .................................. 709/221; 709/219
(58) Field of Classification Search .................. 709/221
See application file for complete search history.

(56) References Cited

U.S. PATENT DOCUMENTS

| | | | |
|---|---|---|---|
| 6,209,018 B1* | 3/2001 | Ben-Shachar et al. | 718/105 |
| 6,223,202 B1* | 4/2001 | Bayeh | 718/102 |
| 7,003,570 B2 | 2/2006 | Messinger et al. | |
| 7,222,148 B2 | 5/2007 | Potter et al. | |
| 7,472,159 B2 | 12/2008 | Freimuth et al. | |
| 2002/0152422 A1* | 10/2002 | Sharma et al. | 714/13 |
| 2002/0194377 A1 | 12/2002 | Doolittle et al. | |
| 2003/0208533 A1* | 11/2003 | Farquharson et al. | 709/203 |
| 2004/0205689 A1* | 10/2004 | Ellens et al. | 717/100 |
| 2004/0230675 A1* | 11/2004 | Freimuth et al. | 709/223 |
| 2005/0060657 A1* | 3/2005 | DeLuca et al. | 715/763 |
| 2005/0228892 A1* | 10/2005 | Riley et al. | 709/228 |
| 2006/0031353 A1* | 2/2006 | Patrick et al. | 709/206 |
| 2007/0130293 A1 | 6/2007 | Dong et al. | |
| 2007/0192701 A1 | 8/2007 | Joines et al. | |
| 2008/0040450 A1 | 2/2008 | Appleyard et al. | |
| 2008/0134014 A1 | 6/2008 | Hind et al. | |
| 2010/0281166 A1* | 11/2010 | Buyya et al. | 709/226 |
| 2011/0219385 A1* | 9/2011 | Jacobson et al. | 719/328 |

OTHER PUBLICATIONS

Harold Carr; Server-side Encoding, Protocol and Transport Extensibility for Remoting Systems; Sun Microsystems, Inc.; ICSOC'04, Nov. 15-19, 2004, New York, NY; pp. 329-334.
Eric Dalquist; Re: [JASIG-DEV] Parallel Rendering of JSPs, Portlets, and Priviledged Channels; http://www.mail-archive.com/jasig-dev@unm.edu/msg00052.html; 3 pages, Sep. 20, 2006.
Marco Seifried et al.; Enhancing portal page rendering performance by managing long-running back-end calls; http:www.ibm.com/developerworks/websphere/library/techarticles/05 . . . ; 11 pages, Sep. 28, 2005.
Stephan Hesmer et al.; IBM WebSphere Developer Technical Journal: Include remote files in your Web application seamlessly with the new Remote Request Dispatcher; http://www.ibm.com/developerworks/websphere/techjournal/0608_hesm . . . ; 18 pages, Aug. 23, 2006.
Glen Mazza's Weblog; http://www.jroller.com/gmazza/date/20080308; Using multithreading to handle long-running web service calls; 6 pages, Mar. 8, 2008.

* cited by examiner

*Primary Examiner* — Christopher Biagini
(74) *Attorney, Agent, or Firm* — Schmeiser, Olson & Watts; John Pivnichny

(57) ABSTRACT

An admission control method and system. The method includes presenting, by a computer processor of an admission control framework computing system, a configuration user interface comprising lists. The computer processor generates and deploys a modified runtime configuration for the admission control framework computing system. The computer processor injects a runtime component of the admission control framework computing system into a command processing path between a container representing an application server and servants representing application components deployed to the application server. The computer processor intercepts commands transmitted from the container to a first servant of the servants. The computer processor reroutes the commands to a reservation pool configured to inspect the commands.

20 Claims, 4 Drawing Sheets

ADMISSION CONTROL FRAMEWORK METHOD AND SYSTEM

FIELD OF THE INVENTION

The present invention relates to a method and associated system for configuring and operating an admission control framework.

BACKGROUND OF THE INVENTION

Processing commands associated with a system typically comprises an inefficient process with little flexibility. Accordingly, there exists a need in the art to overcome at least some of the deficiencies and limitations described herein above.

SUMMARY OF THE INVENTION

The present invention provides a method comprising:

presenting, by a computer processor of an admission control framework computing system, a configuration user interface comprising a plurality of lists;

generating, by said computer processor in response to a command from an administrator of said admission control framework computing system, a modified runtime configuration for said admission control framework computing system, wherein said modified runtime configuration is associated with an original runtime configuration of said admission control framework computing system;

deploying, by said computer processor, said modified runtime configuration to an application server;

injecting, by said computer processor, a runtime component of said admission control framework computing system into a command processing path between a container representing said application server and a plurality of servants representing application components deployed to said application server;

intercepting, by said computer processor, first commands transmitted from said container to a first servant of said plurality of servants, wherein said first commands are associated with a first request from an application client; and rerouting, by said computer processor, said first commands to a reservation pool configured to inspect said first commands, wherein said reservation pool applies a reservation policy to said first commands to determine if a first reservation will be granted to said first commands.

The present invention provides an admission control framework computing system comprising a computer processor coupled to a computer-readable memory unit, said memory unit comprising instructions that when enabled by the computer processor implement admission control method, said method comprising:

presenting, by said computer processor, a configuration user interface comprising a plurality of lists;

generating, by said computer processor in response to a command from an administrator of said admission control framework computing system, a modified runtime configuration for said admission control framework computing system, wherein said modified runtime configuration is associated with an original runtime configuration of said admission control framework computing system;

deploying, by said computer processor, said modified runtime configuration to an application server;

injecting, by said computer processor, a runtime component of said admission control framework computing system into a command processing path between a container representing said application server and a plurality of servants representing application components deployed to said application server;

intercepting, by said computer processor, first commands transmitted from said container to a first servant of said plurality of servants, wherein said first commands are associated with a first request from an application client; and rerouting, by said computer processor, said first commands to a reservation pool configured to inspect said first commands, wherein said reservation pool applies a reservation policy to said first commands to determine if a first reservation will be granted to said first commands.

The present invention advantageously provides a simple method and associated system capable of processing commands.

DETAILED DESCRIPTION OF THE INVENTION

Figure 1:
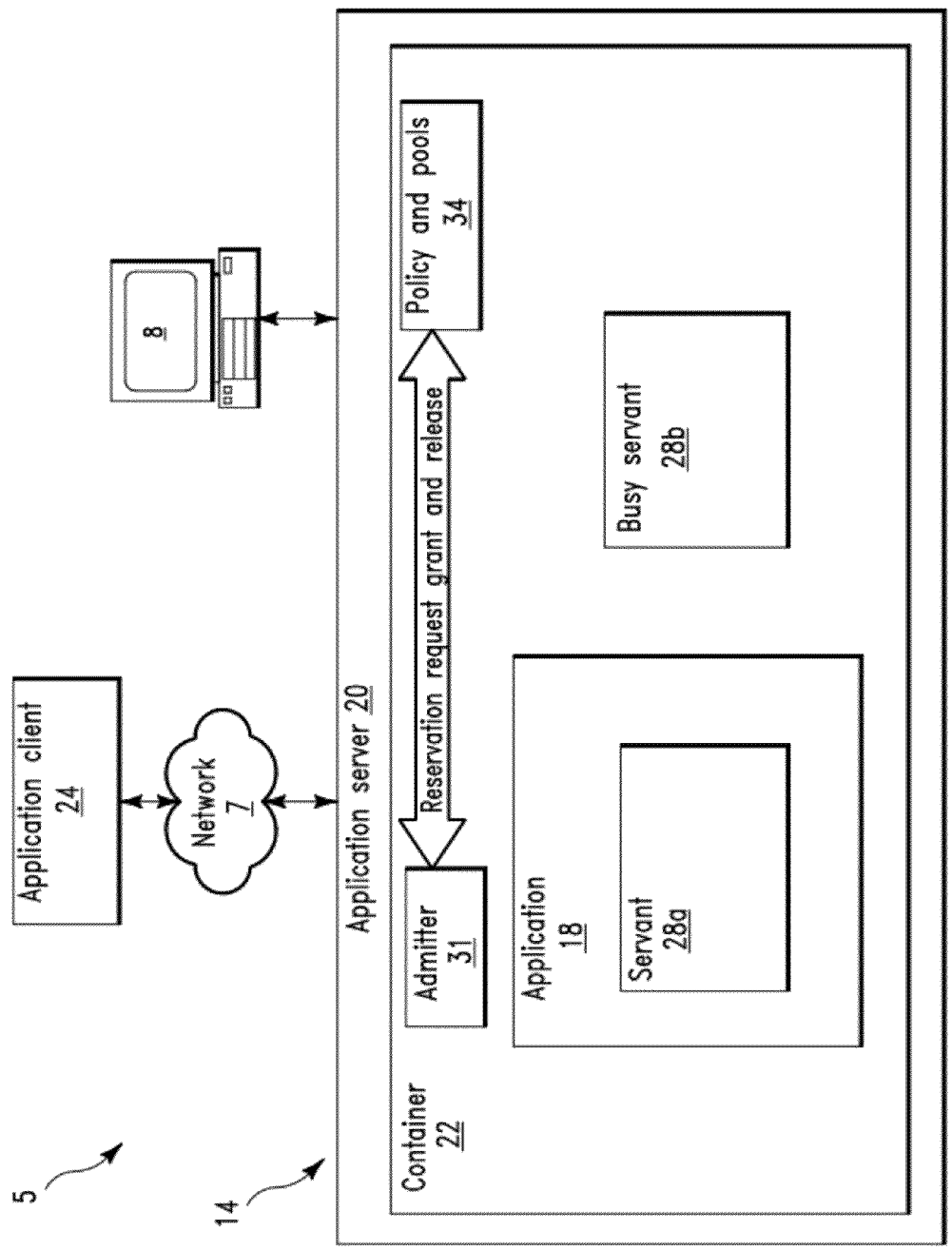
FIG. 1 illustrates a system for configuring an admission control framework, in accordance with embodiments of the present invention.

FIG. 1 illustrates a system 5 for configuring an admission control framework (computing system) 14, in accordance with embodiments of the present invention. System 5 comprises admission control framework 14 that enables a process for classifying portlet requests by classification criteria and diverts additional portlet requests to a busy portlet. A portlet is defined herein as a Web based component that processes requests to generate dynamic content.

System 5 of FIG. 1 comprises an application client computer 24 connected through a network 7 to admission control framework 14. Additionally, system 5 may comprise a user interface computing device 8 directly connected to admission control framework 14. Network 7 may comprise any type of network including, inter alia, a local area network, (LAN), a wide area network (WAN), the Internet, etc. User interface computing device 8 may comprise any type of computing apparatus including, inter alia, a personal computer (PC), a laptop computer, a computer terminal, etc. Admission control framework 14 and application client computer 24 may comprise any type of computing system(s) including, inter alia, a personal computer (PC), a server computer, a database computer, etc. Admission control framework 14 comprises an application server 20. Application server 20 comprises a container 22 (i.e., a component that comprises additional components) that includes an admitter 31, a policy and pools component 34, an (software) application 18, and a busy servant(s) 28b. Application 18 comprises a servant 28a. Servant 28a may comprise multiple servants. A servant is defined herein as central processing unit (CPU) and memory resources selected to enable an object. A busy servant is defined herein as an application implementation of a native servant type. An admitter 31 is defined herein as a dual ported dispatcher that uses a specific policy (e.g., from policy and pools component 34) to dispatch to an application dispatcher or a busy dispatcher. Policy and pools component comprises a pool of reservations and an admission policy that determines whether or not to grant reservations. System 5 enables the following process for configuring admission control framework 14:

1. An administrator prepares to configure the admission control framework by enabling user interface computer 8.
2. The administrator is presented with lists of application servants, lists of reservation pools, and lists of policy templates. The lists of application servants are derived from servant components (e.g., of servant 28*a*) of software applications (e.g., application 18) currently installed in application server 20. The lists of reservation pools are derived from pre-defined pools provided by admission control framework 14 and pools previously configured by an administrator. The lists of policy templates are derived from the list of policy templates provided by admission control framework 14 or by third parties.
3. The administrator constructs a runtime configuration by composing a sequence of the following edits to the existing configuration. These edits may include:
   A. Creating a new reservation pool.
   B. Removing an existing reservation pool.
   C. Associating a policy template with an existing reservation pool and resolving any unbound parameters of the template.
   D. Connecting a servant to an existing reservation pool.
   E. Disconnecting a servant from an existing reservation pool.
4. The administrator elects to deploy the new runtime configuration of admission control framework 14 to application server 20.
5. A manager component of admission control framework 14 communicates with an agent component of admission control framework 14 and deploys the new admission control framework configuration to application server 20.
6. A runtime component of admission control framework 20 (i.e., admitter 31) is injected into a command processing path between container 22 (i.e., representing application server 20) and each servant (each servant representing an application component).
7. Admitter 31 represents itself to container 22 as application servant 28*a* and to each application servant 28*a* as container 22.
8. Application client 24 transmits a request (e.g., for data) to application server 20.
9. Application server 20 intercepts the request and forwards the request to container 22.
10. Container 22 parses the request and constructs one or more commands to be transmitted to one or more of application servants 28*b*.
11. Container 22 schedules and routes each identified command towards target application servants corresponding to each command.
12. Admitter 31 intercepts commands transmitted from container 22 to an application servant (e.g., servant 28*a*) and routes them (i.e., for inspection) to a reservation pool that has been pre-configured to perform inspection of commands destined for the application servant.
13. The reservation pool (i.e., of policy and pools component) applies a reservation policy to the command using heuristics determined by a policy template to decide whether a reservation should or should not be granted to the command at this time.
14. If a reservation is granted, then the command is dispatched to the application servant and processing proceeds to step 15 as described, infra. If the reservation is not granted, processing is diverted to busy servant 28*b* as described, infra with respect to step 17.
15. Processing of the command by the application servant proceeds and the application servant includes a normal response output in a response portion of the command.
16. The application servant returns to admitter 31.
17. Admitter 31 releases the reservation (i.e., allocated in Step 13) back to the pool that allocated it and processing proceeds to step 21 as described, infra. If processing was diverted in step 14, then the command is dispatched to busy servant 28*b*.
18. Busy servant 18 derives a promise from contents of a request portion of the command. The promise encodes a sufficient state allowing the request portion of the original command to be restored at a future time.
19. Busy servant 28*b* encodes the promise (or a reference to the promise) in the response portion of the command.
20. Busy servant 28*b* returns to admitter 22.
21. Admitter 31 returns to container 22.
22. Container 22 waits until all scheduled commands from the original request have been enabled.
23. Container 22 encodes the response parts of the commands derived from the original client request into the response sent to the application client.
24. Application client 24 receives an aggregated response from application server 20.
25. Application client 24 renders the aggregated response from application server 20 resulting in rendering response components derived from each application servant or busy servant to which a command was dispatched during the request processing phase.
26. In cases where a response output component was derived from a command that was successfully delivered to application servant 28*a*, the output rendered will be identical to an output generated by application servant 28*a*.
27. In cases where a response output component was derived from a command that was diverted to busy servant 28*b*, the output rendered will be derived from the output of busy servant 28*b*.
28. Output derived from busy servant 28*b* typically includes an indication that delivery of the original request to the intended application servant was deferred and will include a representation of a resume action that will allow a new request to be transmitted to application server comprising a reference to the promise generated in step 18. Depending on implementation decisions made regarding the representation of promise state in step 18, the output generated by busy servant 28*b* may also include a rendering of a complete promise state.
29. Application client 24 waits for a user to take a subsequent action.
30. If the user chooses to take the resume action presented by step 28, a new request is transmitted to application server 20 and is processed according to steps 8-13. Processing then proceeds to step 31 if a reservation is now granted or to step 32 if a reservation continues to be refused.
31. Admitter 31 restores the command request state associated with the original promise generated in step 18 and dispatches the restored command to application servant 28*a*. Processing then proceeds according to step 15.
32. Otherwise, processing proceeds according to Step 19 using the promise originally created by the first enablement of Step 18.

System 5 of FIG. 1, corrects issues associated with loss of availability of container 22 by causing commands targeted to busy application servants to be quickly removed from container 22 thereby freeing up a thread that would otherwise have been consumed by a command targeted towards a blocking application servant. Application clients with pending commands to a blocking servant are temporarily and gracefully denied access to the blocking servant. Likewise, application clients that do not require access to the blocking servant are not affected by the blockage in the blocking servant. If a blockage in the blocking servant is removed, then any blocked client is then able to resubmit its original request and resume their workflow as if the blockage had not occurred. System 5 allows consequences of blocking behavior in arbitrary applications to be ameliorated without requiring changes to applications themselves. Steps 1-5 (as described, supra) allow admission control policies to be dynamically adjusted in response to conditions that cause applications to block.

Figure 2:
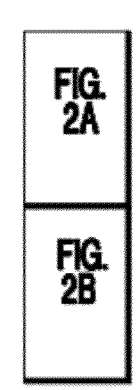
FIG. 2 including
Figure 2A:
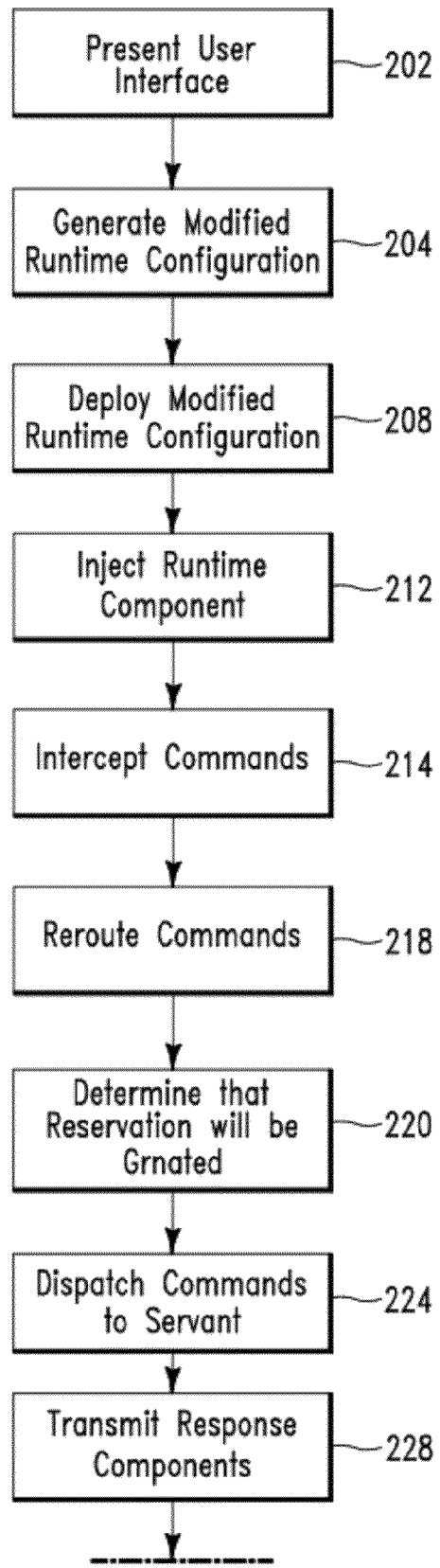
FIGS. 2A and 2B illustrates a flowchart describing an algorithm used by the system of FIG. 1 for configuring the admission control framework, in accordance with embodiments of the present invention.
Figure 2B:
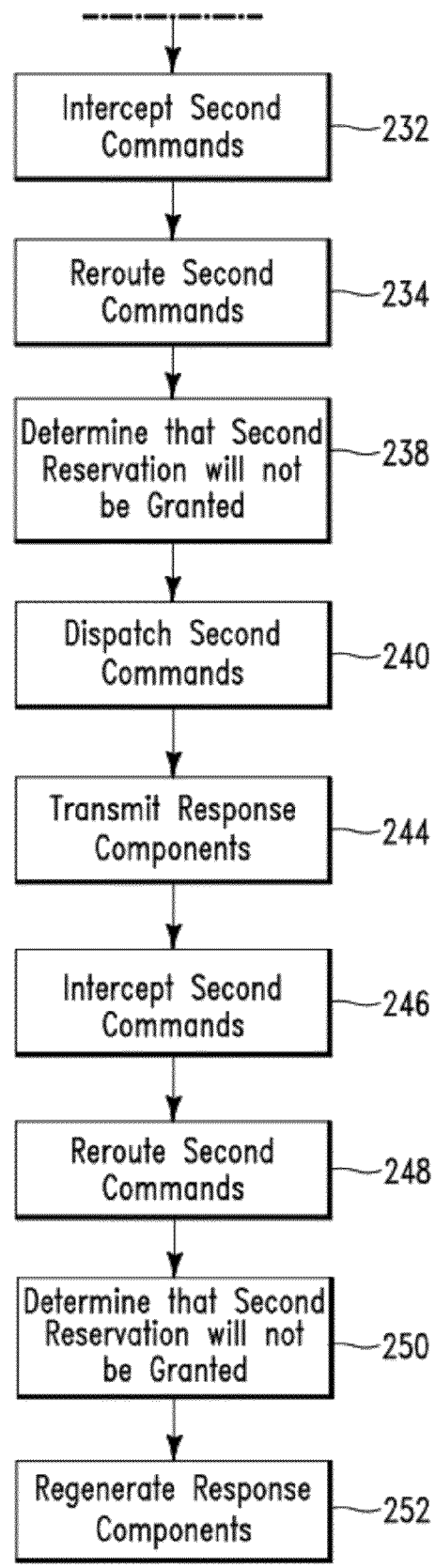

FIG. 2 including FIGS. 2A and 2B illustrates a flowchart describing an algorithm used by system 5 of FIG. 1 for configuring admission control framework 14, in accordance with embodiments of the present invention. In step 202, a computer processor of an admission control framework (e.g., admission control framework 14 of FIG. 1) presents a configuration user interface (i.e., via a user interface such as, inter alia, user interface computer 8 of FIG. 1) comprising a plurality of lists. The plurality of lists may comprise application servant lists, reservation pool lists, policy template lists, etc. In step 204, the computer processor generates (i.e., in response to a command from an administrator of the admission control framework) a modified runtime configuration for the admission control framework. The modified runtime configuration is associated with an original runtime configuration of the admission control framework. Generating the modified runtime configuration may include the following processes:

Process 1
1. Associating a policy template with an existing reservation pool.
2. Connecting a first servant to the existing reservation pool.
3. Configuring parameters associated with an instantiated policy template associated with the reservation pool.

Process 2
1. Generating a new reservation pool.
2. Disconnecting a servant from an existing reservation pool.
3. Removing the existing reservation pool.

In step 208, the computer processor deploys the modified runtime configuration to an application server (e.g., application server 20 of FIG. 1). In step 212, the computer processor injects a runtime component (i.e., of the admission control framework) into a command processing path between a container (e.g., container 22 in FIG. 1) representing the application server and a plurality of servants representing application components deployed to the application server. In step 214, the computer processor intercepts first commands transmitted from the container to a first servant of the plurality of servants. The first commands are associated with a first request from an application client (e.g., application client 24 of FIG. 1). In step 218, the computer processor reroutes the first commands to a reservation pool configured to inspect the first commands. The reservation pool applies a reservation policy to the first commands to determine if a first reservation will be granted to the first commands. In step 220, it is determined (i.e., by the reservation policy) that the first reservation will be granted to the first commands. In step 224, the computer processor (i.e., in response to step 220) dispatches the first commands to the first servant and receives a response generated by the first servant. In step 228, the computer processor transmits response components to the container. The container encodes response portions for each command of the first commands. The application server transmits an aggregated response to the application client. The application client receives the aggregated response from the application server and the aggregated response comprises components derived from the first servant. In step 232, the computer processor intercepts (i.e., in response to user input) second commands transmitted from the container to a second servant of the plurality of servants. The second commands are associated with a second request from the application client. In step 234, the computer processor reroutes the second commands to the reservation pool configured to inspect the second commands. The reservation pool applies the reservation policy to the second commands to determine if a second reservation will be granted to the second commands. In step 238, it is determined (i.e., by the reservation policy) that the second reservation will not be granted to the second commands. In step 240, computer processor dispatches the second commands to a busy servant (e.g., busy servant 28b in FIG. 1). The busy servant derives a promise from contents of a request portion of the second commands. The promise encodes a state configured to allow the request portion to be restored during a future timeframe. The busy servant encodes the promise in response to the second commands. In step 244, the computer processor transmits second response components to the container and in response, the container encodes response portions for each command of the second commands. The application client receives the second response components from the busy servant. The second response components are derived from the busy servant. An output derived from the busy servant comprises:
1. First data indicating that delivery of the second request has been deferred.
2. Second data comprising a representation of a resume action allowing a new request to be transmitted. The resume action comprises a reference to the promise.

In step 246, the computer processor intercepts (i.e., in response to user input) the second commands transmitted from the container to the first servant. The second commands are associated with a resume request from the application client. The resume request includes the promise. In step 248, computer processor reroutes the second commands to the reservation pool (i.e., configured to inspect the second commands). In response, the reservation pool applies the reservation policy to the second commands to determine if a second reservation will be granted to the second commands. An admitter of the admission control framework restores the promise and dispatches a restored command to the first servant. In step 250, it is determined that the second reservation will not be granted. In step 252, the second response components are regenerated thereby allowing a resume request for the first commands to be resubmitted again at a later time.

Figure 3:
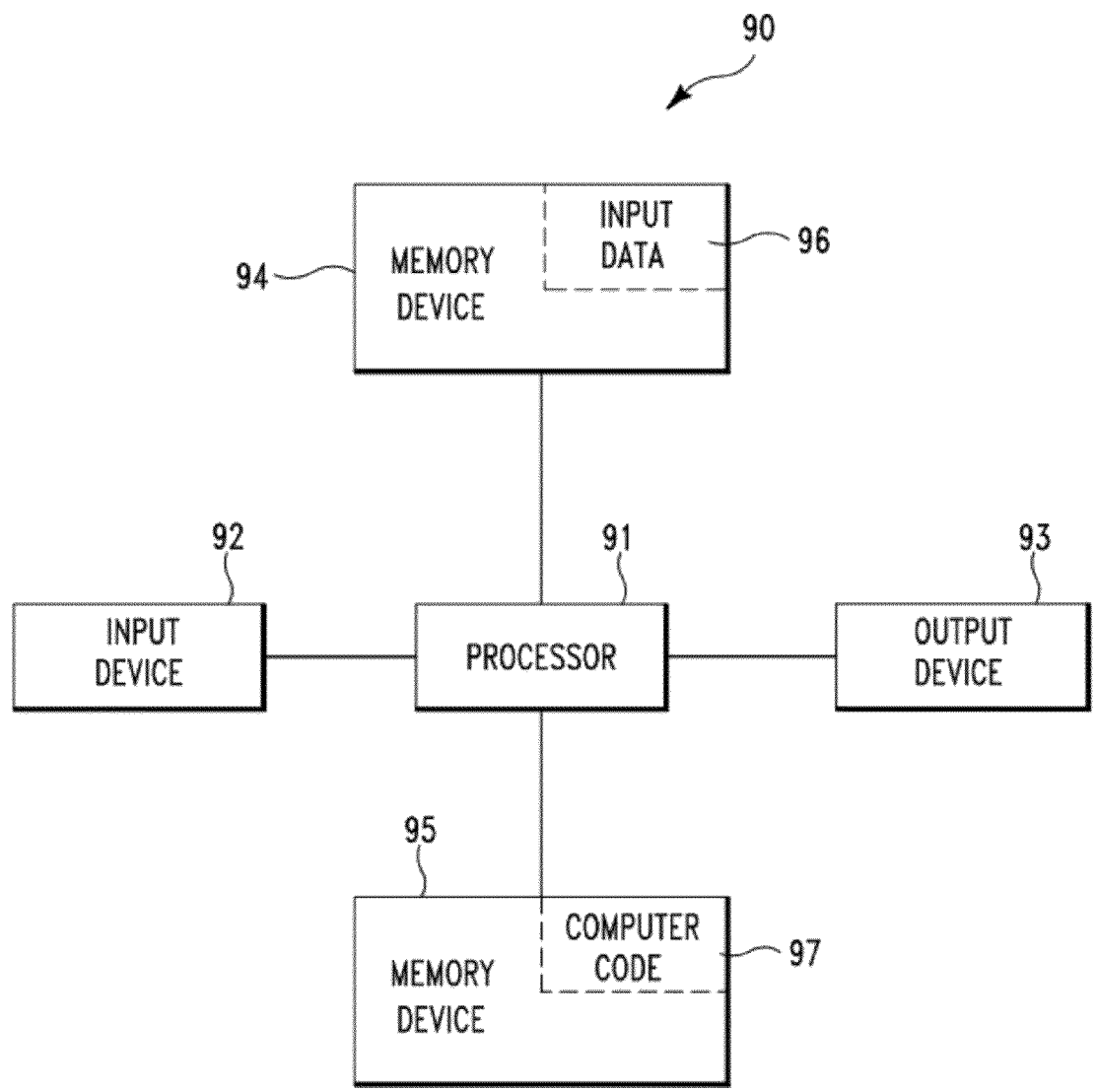
FIG. 3 illustrates a computer apparatus used for configuring an admission control framework, in accordance with embodiments of the present invention.

FIG. 3 illustrates a computer apparatus 90 (e.g., admission control framework 14 of FIG. 1) used for configuring an admission control framework, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for configuring an admission control framework. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to configure an admission control framework. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for configuring an admission control framework. In another embodiment, the invention provides a method that performs the process steps of the invention on a subscription, advertising, and/or fee basis. That is, a service provider, such as a Solution Integrator, could offer to configure an admission control framework. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   presenting, by a computer processor of an admission control framework computing system, a configuration user interface comprising a plurality of lists;
   generating, by said computer processor in response to a command from an administrator of said admission control framework computing system, a modified runtime configuration for said admission control framework computing system, wherein said modified runtime configuration is associated with an original runtime configuration of said admission control framework computing system;
   deploying, by said computer processor, said modified runtime configuration to an application server;
   injecting, by said computer processor, a runtime component of said admission control framework computing system into a command processing path between a container representing said application server and a plurality of servants representing application components deployed to said application server;
   intercepting, by said computer processor, first commands transmitted from said container to a first servant of said plurality of servants, wherein said first commands are associated with a first request from an application client; and
   rerouting, by said computer processor, said first commands to a reservation pool configured to inspect said first commands, wherein said reservation pool applies a reservation policy to said first commands to determine if a first reservation will be granted to said first commands.

2. The method of claim 1, wherein said reservation policy determines that said first reservation will be granted to said first commands, and wherein said method further comprises:
   dispatching, by said computer processor, said first commands to said first servant.

3. The method of claim 2, further comprising:
   receiving, by said computer processor, a response generated by said first servant;
   transmitting, by said computer processor, response components to said container, wherein said container encodes response portions for each command of said first commands, wherein said application server transmits an aggregated response to said application client, wherein said application client receives said aggregated response from said application server, and wherein said aggregated response comprises components derived from said first servant;
   intercepting, by said computer processor in response to user input, second commands transmitted from said container to a second servant of said plurality of servants, wherein said second commands are associated with a second request from said application client; and
   rerouting, by said computer processor, said second commands to said reservation pool configured to inspect said second commands, wherein said reservation pool applies said reservation policy to said second commands to determine if a second reservation will be granted to said second commands.

4. The method of claim 3, wherein said reservation policy determines that said second reservation will not be granted to said second commands, and wherein said method further comprises:
   dispatching, by said computer processor, said second commands to a busy servant, wherein said busy servant derives a promise from contents of a request portion of said second commands, wherein said promise encodes a state configured to allow said request portion to be restored during a future timeframe, and wherein said busy servant encodes said promise in response to said second commands.

5. The method of claim 4, further comprising:
   transmitting, by said computer processor, second response components to said container, wherein said container encodes response portions for each command of said second commands, wherein said application client receives said second response components from said busy servant, wherein said second response components are derived from said busy servant, wherein an output derived from said busy servant comprises first data indicating that delivery of said second request has been deferred and second data comprising a representation of a resume action allowing a new request to be transmitted, and wherein said resume action comprises a reference to said promise;

intercepting, by said computer processor in response to user input, said second commands transmitted from said container to said first servant, wherein said second commands are associated with a resume request from said application client, and wherein said resume request comprises said promise; and rerouting, by said computer processor, said second commands to said reservation pool configured to inspect said second commands, wherein said reservation pool applies said reservation policy to said second commands to determine if a second reservation will be granted to said second commands, and wherein an admitter of said admission control framework computing system restores said promise and dispatches a restored command to said first servant.

6. The method of claim 5, wherein said second reservation is not granted, and wherein said method further comprises:

regenerating said second response components thereby allowing a resume request for said first commands to be resubmitted again at a later time.

7. The method of claim 1, wherein said plurality of lists comprise an application servant list, a reservation pool list, and a policy template list.

8. The method of claim 1, wherein said generating said modified runtime configuration comprises:

associating a policy template with an existing reservation pool;

connecting said first servant to said existing reservation pool; and configuring parameters associated with an instantiated policy template associated with said reservation pool.

9. The method of claim 1, wherein said generating said modified runtime configuration comprises:

generating a new reservation pool;

disconnecting said servant from an existing reservation pool; and removing said existing reservation pool.

10. The method of claim 1, further comprising:

providing at least one support service for at least one of creating, integrating, hosting, maintaining, and deploying computer-readable code in said computing system, wherein the code in combination with the computing system is capable of performing: said presenting, said generating, said deploying, said injecting, said intercepting, and said rerouting.

11. The method of claim 1, further comprising:

providing a computer program product, comprising a computer storage medium comprising a computer readable program code embodied therein, wherein said computer readable program code is configured to perform: said presenting, said generating, said deploying, said injecting, said intercepting, and said rerouting.

12. An admission control framework computing system comprising a computer processor coupled to a computer-readable memory unit, said memory unit comprising instructions that when enabled by the computer processor implement admission control method, said method comprising:

presenting, by said computer processor, a configuration user interface comprising a plurality of lists;

generating, by said computer processor in response to a command from an administrator of said admission control framework computing system, a modified runtime configuration for said admission control framework computing system, wherein said modified runtime configuration is associated with an original runtime configuration of said admission control framework computing system;

deploying, by said computer processor, said modified runtime configuration to an application server;

injecting, by said computer processor, a runtime component of said admission control framework computing system into a command processing path between a container representing said application server and a plurality of servants representing application components deployed to said application server;

intercepting, by said computer processor, first commands transmitted from said container to a first servant of said plurality of servants, wherein said first commands are associated with a first request from an application client; and rerouting, by said computer processor, said first commands to a reservation pool configured to inspect said first commands, wherein said reservation pool applies a reservation policy to said first commands to determine if a first reservation will be granted to said first commands.

13. The computing system of claim 12, wherein said reservation policy determines that said first reservation will be granted to said first commands, and wherein said method further comprises:

dispatching, by said computer processor, said first commands to said first servant.

14. The computing system of claim 13, wherein said method further comprises:

receiving, by said computer processor, a response generated by said first servant;

transmitting, by said computer processor, response components to said container, wherein said container encodes response portions for each command of said first commands, wherein said application server transmits an aggregated response to said application client, wherein said application client receives said aggregated response from said application server, and wherein said aggregated response comprises components derived from said first servant;

intercepting, by said computer processor in response to user input, second commands transmitted from said container to a second servant of said plurality of servants, wherein said second commands are associated with a second request from said application client; and rerouting, by said computer processor, said second commands to said reservation pool configured to inspect said second commands, wherein said reservation pool applies said reservation policy to said second commands to determine if a second reservation will be granted to said second commands.

15. The computing system of claim 12, wherein said reservation policy determines that said reservation will not be granted to said commands, and wherein said method further comprises:

dispatching, by said computer processor, said second commands to a busy servant, wherein said busy servant derives a promise from contents of a request portion of said second commands, wherein said promise encodes a state configured to allow said request portion to be restored at during a future timeframe, and wherein said busy servant encodes said promise in response to said second commands.

16. The computing system of claim 15, wherein said method further comprises:

transmitting, by said computer processor, response components to said container, wherein said container encodes response portions for each command of said second commands, wherein said application client receives said response components to said busy servant, wherein said response components are derived from said busy servant, wherein said output derived from said busy servant comprises first data indicating that delivery of said second request has been deferred and second data comprising a representation of a resume action allowing a new request to be transmitted, and wherein said resume action comprises a reference to said promise;

intercepting, by said computer processor in response to user input, said second commands transmitted from said container to said first servant, wherein said second commands are associated with a resume request from said application client, and wherein said resume request comprises said promise; and rerouting, by said computer processor, said second commands to said reservation pool configured to inspect said second commands, wherein said reservation pool applies said reservation policy to said second commands to determine if a second reservation will be granted to said second commands, and wherein an admitter of said admission control framework computing system restores said promise and dispatches a restored command to said first servant.

17. The computing system of claim 16, wherein said second reservation is not granted, and wherein said method further comprises:

regenerating said response components thereby allowing a resume request for said first commands to be resubmitted again at a later time.

18. The computing system of claim 12, wherein said plurality of lists comprise an application servant list, a reservation pool list, and a policy template list.

19. The computing system of claim 12, wherein said generating said modified runtime configuration comprises:

associating a policy template with an existing reservation pool;

connecting said first servant to said existing reservation pool; and configuring parameters associated with an instantiated policy template associated with said reservation pool.

20. The computing system of claim 12, wherein said generating said modified runtime configuration comprises:

generating a new reservation pool;

disconnecting said servant from an existing reservation pool; and removing said existing reservation pool.

* * * * *